United States Patent
Satou et al.

(10) Patent No.: US 10,739,753 B2
(45) Date of Patent: Aug. 11, 2020

(54) NUMERICAL CONTROLLER HAVING REDUCED WAITING TIME FOR INTERFERENCE AVOIDANCE

(71) Applicant: FANUC CORPORATION, Minamitsuru-gun, Yamanashi (JP)

(72) Inventors: Takashi Satou, Yamanashi (JP); Takeshi Mochida, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 139 days.

(21) Appl. No.: 16/039,836

(22) Filed: Jul. 19, 2018

(65) Prior Publication Data
US 2019/0033823 A1    Jan. 31, 2019

(30) Foreign Application Priority Data
Jul. 26, 2017    (JP) .................. 2017-144072

(51) Int. Cl.
G05B 19/4061    (2006.01)
G05B 19/414    (2006.01)
G05B 19/4155    (2006.01)

(52) U.S. Cl.
CPC ..... *G05B 19/4061* (2013.01); *G05B 19/4141* (2013.01); *G05B 19/4155* (2013.01); *G05B 2219/50112* (2013.01)

(58) Field of Classification Search
CPC ............ G05B 19/4061; G05B 19/4141; G05B 19/4155; G05B 2219/50112
See application file for complete search history.

(56) References Cited

U.S. PATENT DOCUMENTS

| 5,931,070 A | * | 8/1999 | Miyajima ............ B21D 28/002 |
| | | | 83/39 |
| 2002/0148820 A1 | * | 10/2002 | Tomlinson ............... B23Q 3/18 |
| | | | 219/121.82 |
| 2012/0221137 A1 | * | 8/2012 | Kettemer ........... G05B 19/4061 |
| | | | 700/108 |

FOREIGN PATENT DOCUMENTS

| JP | 05131297 A | | 5/1993 |
| JP | 8-318332 A | | 12/1996 |
| JP | 08318332 A | * | 12/1996 |
| JP | 0910858 A | | 1/1997 |
| JP | 11129040 A | | 5/1999 |

OTHER PUBLICATIONS

Miyamoto, Machine Translation of JPH05131297A (Year: 1993).*
Japanese Notice of Reasons for Refusal for Japanese Application No. 2017-144072, dated Mar. 12, 2019 with translation, 8 pages.

* cited by examiner

*Primary Examiner* — Rocio Del Mar Perez-Velez
*Assistant Examiner* — Hung H Dang
(74) *Attorney, Agent, or Firm* — RatnerPrestia

(57) ABSTRACT

The numerical controller determines a possibility of interference between a tool and an obstacle on a workpiece and, based on the determination result, switches the end point position of the rising motion of the tool in command data to a retreat position from a rising edge or stops the movements of X/Y axes by a next command block until rising motion of a press axis of the machine tool by the command data is completed. In this way, wasteful deceleration is prevented from occurring when interference between the tool and the obstacle is avoided during machining.

4 Claims, 8 Drawing Sheets

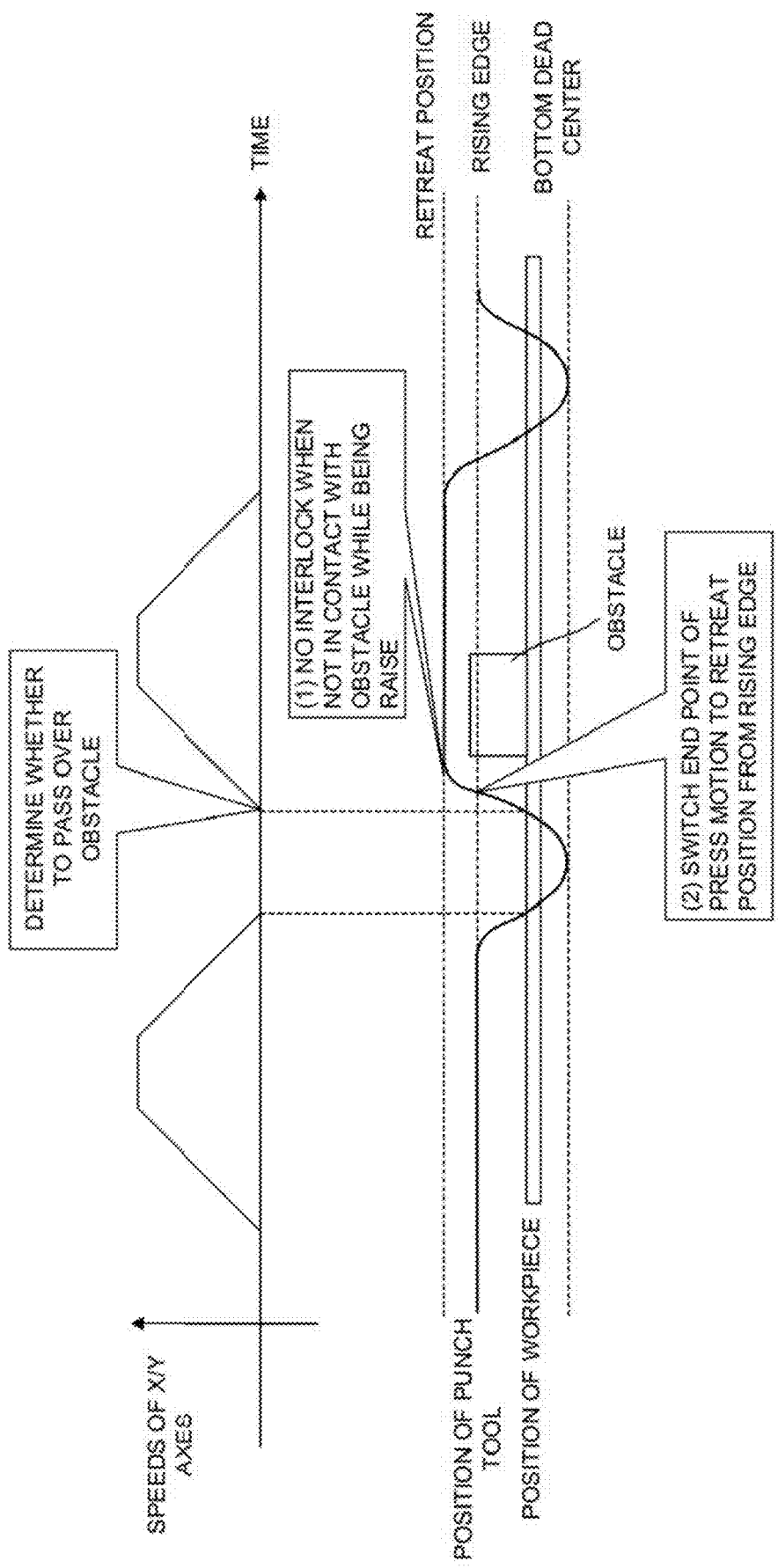

NUMERICAL CONTROLLER HAVING REDUCED WAITING TIME FOR INTERFERENCE AVOIDANCE

CROSS-REFERENCE TO RELATED APPLICATION

This application is a new U.S. patent application that claims benefit of Japanese Patent Application No. 2017-144072, filed Jul. 26, 2017, the disclosure of this application is being incorporated herein by reference in its entirety for all purposes.

BACKGROUND OF THE INVENTION

1. Field of the Invention

The present invention relates to a numerical controller and, more particularly, to a numerical controller which reduces a waiting time for a press axis to avoid an obstacle.

2. Description of the Related Art

In punch press machines, punch press machining is performed by press motion (punch motion) after a punch point on a workpiece is moved, based on movement commands of X/Y axes commanded by a program, to a position of a punch tool selected by a turret mechanism or the like in a punch head.

In punch press machines, pressing is performed with the least possible strokes (rising edge to bottom dead center) during normal machining. Herein, as shown in FIG. 6, there is an interference avoidance technique which avoids interference between the punch tool and an obstacle when the punch tool attached to the punch head passes over the obstacle set in advance as a parameter, such as a work holder, during the movement to the nest press position, by notifying the machine of the punch tool passing over the obstacle at the start of execution of a block, performing the X/Y axes interlock (temporarily stopping the movement of the axes) in the punch press machine, and raising the press axis to a retreat position (see, for example, Japanese Patent Application Laid-Open No. 08-318332).

However, when the interference avoidance technique described above is used, wasteful interlock control is performed, which may reduce the cycle time of machining. As shown in FIG. 7, in a case where an obstacle is near a press position at the start of execution of a block, for example, a case where the obstacle is at a position A, it is impossible to the avoid an interference between the punch tool and the obstacle even when the press axis is tried to be raised to the retreat position while the X/Y axes are moved. Thus, it is necessary to interlock the X/Y axes. On the other hand, in a case where it is known that an obstacle is away from a press position at the start of execution of a block, for example, a case where the obstacle is at a position B, the punch head does not interfere with the obstacle even when the press axis is raised to the retreat position while the X/Y axes are moved. Thus, it is unnecessary to interlock the X/Y axes. When the interference-machining technique according to the conventional technique is used, the X/Y axes are interlocked even in the latter case (a case where the obstacle is at the position B instead of the position A). Thus, the cycle time of machining is reduced.

Moreover, in the example shown in FIG. 7, when the obstacle is at the position A and the X/Y axes are interlocked, the punch head is further moved to the retreat position after once reached the rising edge (after the press motion is completed). Thus, the time required for moving the punch tool to the retreat position becomes longer due to wasteful deceleration, which again causes a problem that the cycle time of the machining is reduced.

SUMMARY OF THE INVENTION

Thereupon, an object of the present invention is to provide a numerical controller which can prevent wasteful deceleration from occurring when the interference between a punching tool and an obstacle is avoided during machining.

The numerical controller according to the present invention solves the aforementioned problems by controlling X/Y axes not to be interlocked as shown in (1) of FIG. 8 when a punch tool passes over an obstacle and does not reach the obstacle until the punch tool reaches a retreat position.

Furthermore, the numerical controller according to the present invention solves the aforementioned problems by switching the end point of the press motion to the retreat position from a rising edge as shown in (2) of FIG. 8 when it is detected, based on information on a next block prefetched, that the punch tool passes a position where the obstacle is positioned. Note that the end point of the press axis may be switched to the retreat position from the rising edge by installing a sensor for acquiring the distance and position of the obstacle in a machine tool to notify the numerical controller of the approach of the obstacle.

A numerical controller according to the present invention controls, based on a program, a machine tool for performing punch press machining on a workpiece by a tool attached to a punch head and includes: a command analysis on it that analyzes a command block read out from the program, generates command data and outputs the generated command data; an interpolation unit that performs interpolation processing based on the command data, generates interpolation data and outputs the generated interpolation data; an interference determination unit that determines a possibility of interference between the tool and an obstacle on the workpiece; and both or one of a rising and point position switching unit that switches an end point position of rising motion of the tool in the command data to a retreat position from a rising edge based on a determination result by the interference determination unit and an interlock control unit that stops movements of X/Y axes by a command block next to the command block until rising motion of a press axis of the machine tool by the command data is completed.

The numerical controller according may further include a parameter storage unit that stores a position of the obstacle as a parameter, in which the interference determination unit determines whether the tool interferes with the obstacle on the workpiece based on the position of the obstacle stored in the parameter storage unit.

The machine tool may include a sensor that detects a position of the obstacle on the workpiece, and the interference determination unit may determine whether the tool interferes with the obstacle on the workpiece based on the position of the obstacle detected by the sensor.

According to the present invention, unnecessary interlock and wasteful deceleration do not occur when interference between a punch tool and an obstacle is avoided by using an interference avoidance technique so that the cycle time of machining can be shortened.

BRIEF DESCRIPTION OF THE DRAWINGS

FIG. 8 is a diagram for explaining the outline of the interference avoidance function according to the present invention.

DETAILED DESCRIPTION OF THE PREFERRED EMBODIMENTS

A configuration example of a numerical controller for realizing the present invention will be described hereinafter. However, the configuration of the numerical controller according to the present invention is not limited to the following examples, and any configuration may be adopted as long as the object of the present invention can be realized.

Figure 1:
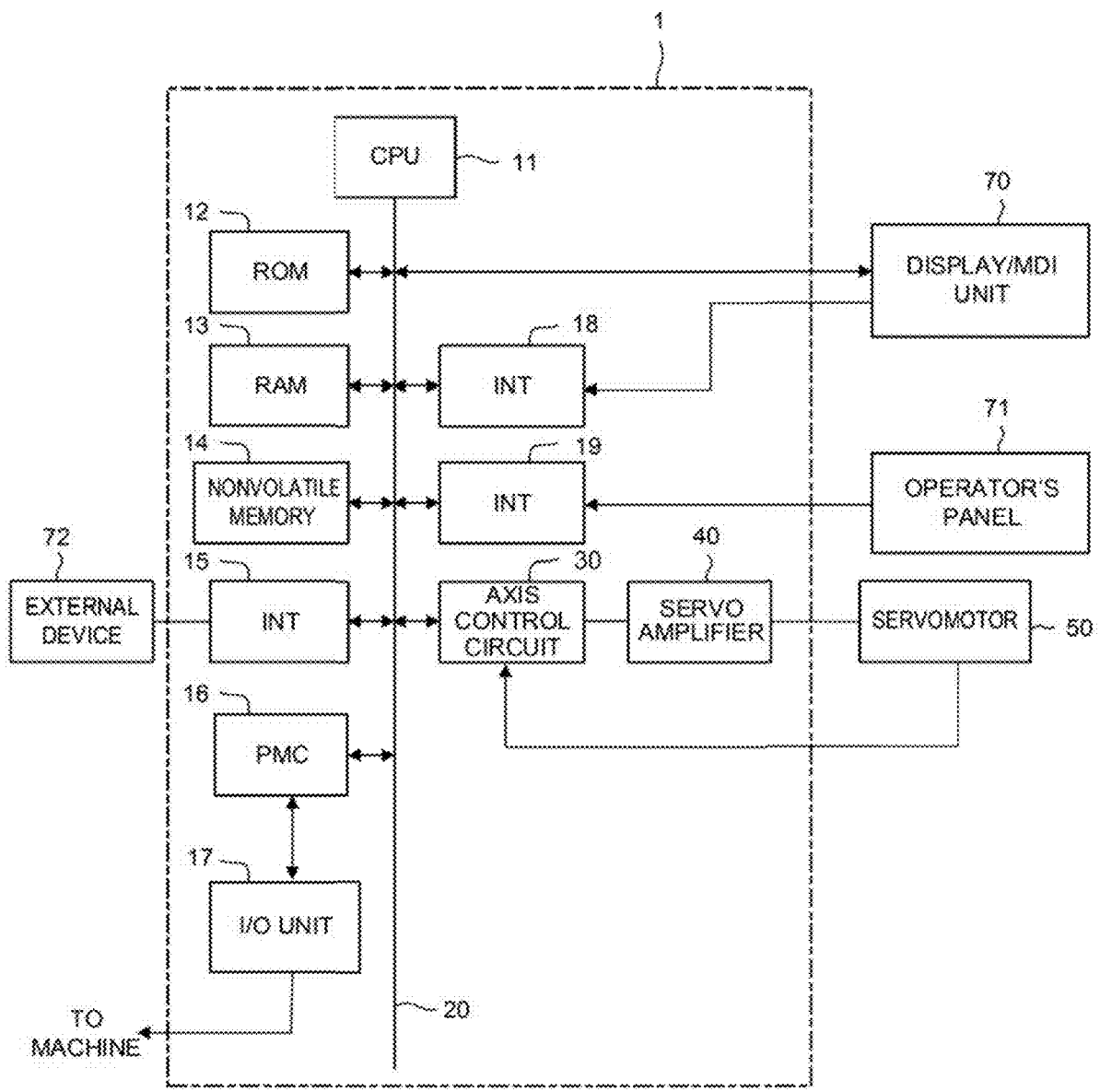
FIG. 1 is a schematic hardware configuration diagram showing a numerical controller according to one embodiment and a main part of a machine tool driven and controlled by the numerical controller.

FIG. 1 is a schematic hardware configuration diagram showing a numerical controller according to one embodiment and a main part of a machine tool driven and controlled by the numerical controller.

A CPU 11 included in a numerical controller 1 according to the present embodiment reads out a system program stored in a ROM 12 via a bus 20 and controls the entire numerical controller 1 according to the system program. A RAM 13 stores temporary calculation data, display data, various data inputted by an operator via a display/MDI unit 70 described later, and the like.

A nonvolatile memory 14 is configured as a memory that is kept in a storage state, for example, by being backed up by a battery (not shown) even when the power supply of the numerical controller 1 is turned off. In addition to an NC program loaded via an interface 15 and an NC program inputted via the display/MDI unit 70 described later, tool data including a recommended value of a cutting condition of a tool used for machining, and the like are stored in this nonvolatile memory 14. The nonvolatile memory 14 further stores an NC program running processing program and the like used for running the NC program, and these programs are developed in the RAM 13 at the time of execution. Moreover, in the ROM 12, various system programs (including a system program for an interference avoidance function) for executing an edit mode processing necessary to create and edit the NC program and other necessary processing are written in advance.

The interface 15 is an interface for connecting the numerical controller 1 and an external device 72 such as an adapter. From the external device 72, the NC programs, various parameters and the like are loaded. Furthermore, the NC program edited in the numerical controller 1 can be stored in an external storage means via the external device 72. A programmable machine controller (PMC) 16 outputs a signal to peripheral devices (e.g., an actuator such as a robot hand for tool exchange) of the machine tool via an I/O unit 17 and controls the peripheral devices based on a sequence program incorporated into the numerical controller 1. Further, the PMC 16 receives signals from various switches and the like of an operator's panel arranged at the main body of the machine tool and delivers the signal to the CPU 11 after necessary signal processing is performed.

The display/MDI unit 70 is a manual data input device including a display, a keyboard, and the like, and an interface 18 receives commands and data from the keyboard of the display/MDI unit 70 and passes those to the CPU 11. An interface 19 is connected to an operator's panel 71 including a manual pulse generator and the like used for manually driving respective axes.

An axis control circuit 30 for controlling the axis included in the machine tool receives a movement command amount of the axis from the CPU 11 and outputs the command of the axis to a servo amplifier 40. In response to these command, the servo amplifier 40 drives a servomotor 50 which moves the axis included in the machine tool. The servomotor 50 of the axis incorporates a position/speed detector and feedbacks a position/speed feedback signal from this position/speed detector to the axis control circuit 30 to perform feedback control of the position/speed. Note that only one axis control circuit 30, one servo amplifier 40 and one servomotor 50 are shown in the hardware configuration diagram in FIG. 1, but those are actually prepared by the number of axes included in the machine tool of the respective systems to be controlled. For example, in a punch press machine, the axis control circuits 30, the servo amplifiers 40, and the servomotors 50 are provided respectively for controlling an X axis and a Y axis for changing the relative positions of a punch head and a workpiece in the horizontal direction and for controlling a press axis for performing press motion (for changing the relative positions of the punch head and the workpiece in the vertical direction).

Figure 2:
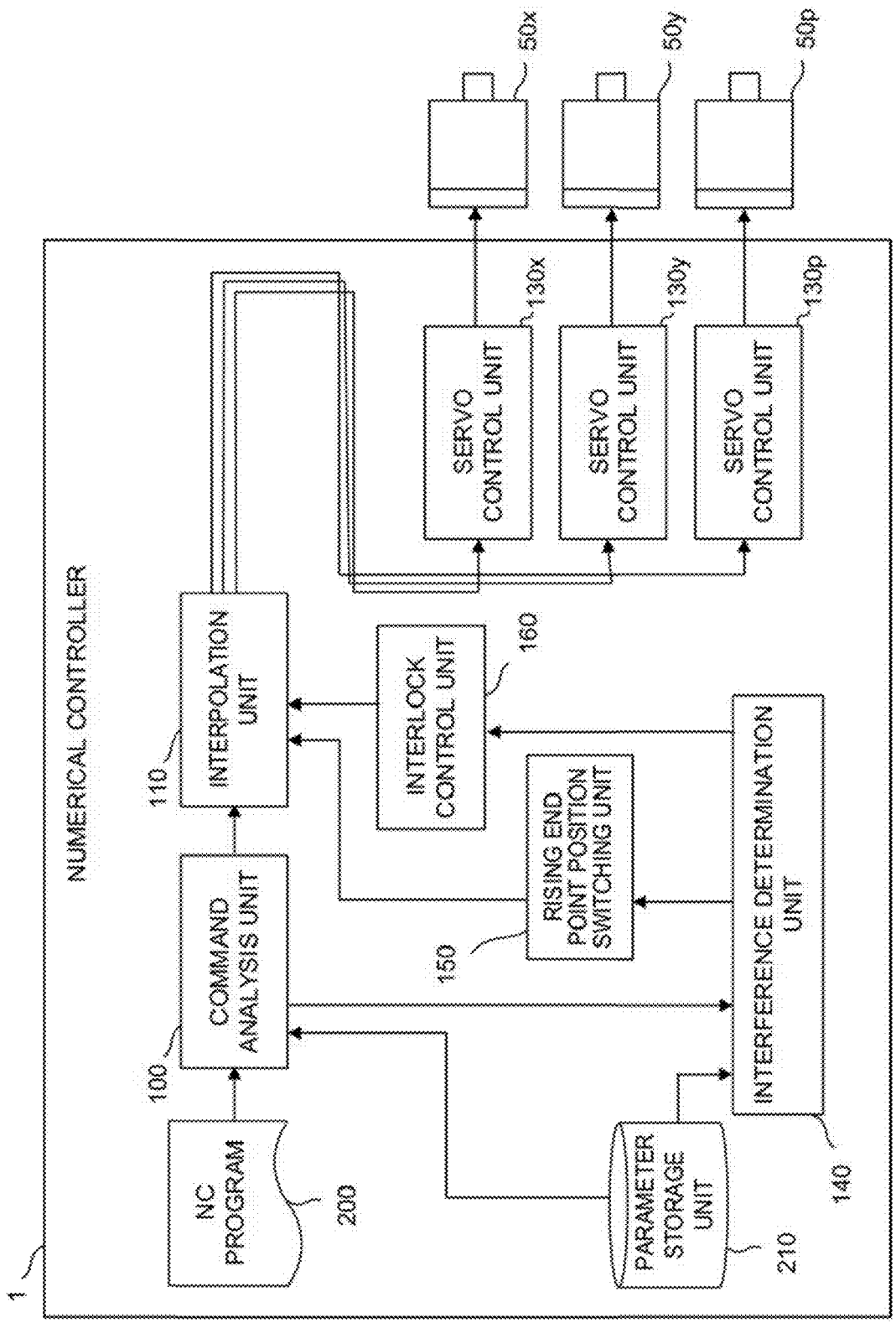
FIG. 2 is a schematic functional block diagram of the numerical controller in a case where a system program for realizing an interference avoidance function is implemented in the numerical controller in FIG. 1.

FIG. 2 is a schematic functional block diagram showing a main part of the numerical controller according to one embodiment of the present invention in a case where a system program for realizing an interference avoidance function of the present invention is implemented in the numerical controller 1 shown in FIG. 1.

Each functional block shown in FIG. 2 is realized by executing the system program for the interference avoidance function by the CPU 11 included in the numerical controller 1 shown in FIG. 1 to control the operation of each unit of the numerical controller 1. The numerical controller 1 includes a command analysis unit 100, an interpolation unit 110, servo control units 130$x$, 130$y$ and 130$p$, an interference determination unit 140, a rising end point position switching unit 150 and an interlock control unit 160. Moreover, a parameter storage unit 210 that stores parameters, such as a time constant of acceleration/deceleration of each axis, a position of a rising edge, a position of a bottom dead center and a retreat position, which are used to control the punch press motion, is provided on the nonvolatile memory 14. In the parameter storage unit 210, a region for storing parameters indicating a coordinate position and the like of an obstacle may be secured as necessary. Note that each parameter used to control the punch press motion and the parameters indicating the coordinate position and the like of the obstacle, which are stored in the parameter storage unit 210, may be set in advance by a worker via the display/MDI unit 70 or the like. Moreover, in FIG. 2, the servomotors 50$x$, 50$y$ and 50*p* are servomotors which drive the X axis, the Y axis and the press axis, respectively.

The command analysis unit 100 reads out a command block included in an NC program 200 stored in the non-volatile memory 14, analyzes this command block read out, and creates command data for driving a axis to be controlled. This command analysis unit 100 prefetches a predetermined number of command blocks included in the NC program 200 and analyzes those blocks prefetched. Information obtained by prefetching and analyzing by the command analysis unit 100 is used by the interference determination unit 140.

The interpolation unit 110 creates interpolation data obtained by interpolating points on the command path commanded by the movement command data created by the command analysis unit 100 in each the interpolation period and outputs the interpolation data to the servo control units 130*x*, 130*y* and 130*p*. Moreover, in response to a command from the rising end point position switching unit 150, the interpolation unit 110 changes the end point of the rising motion of the press axis in the block currently executed to the retreat position from the rising edge position. Furthermore, in response to a command from the interlock control unit 160, the interpolation unit 110 stops outputting the movement amounts (interpolation data) of the X/Y axes to the servo control units 130*x* and 130*y* by a block next to the block currently executed (i.e., interlocks the X/Y axes) until the press motion of the press axis is completed.

Based on the interpolation data received from the interpolation unit 110, the servo control units 130*x*, 130*y* and 130*p* control the servomotors 50*x*, 50*y* and 50*p* which drive the axes to be controlled, respectively.

Based on the information obtained by prefetching and analyzing by the command analysis unit 100 and the information on the coordinate position of the obstacle, the interference determination unit 140 determines a possibility of interference between the punch tool and the obstacle.

More specifically, based on the information obtained by prefetching and analyzing by the command analysis unit 100 and the information on the coordinate position of the obstacle, the interference determination unit 140 determines whether or not the punch tool passes the position where the obstacle is present. Then, when the interference determination unit 140 determines that the punch tool passes the position where the obstacle is present, the interference determination unit 140 regards that there is a possibility that the punch tool interferes with the obstacle, and commands the rising end point position switching unit 150 to switch the end point of the rising motion of the press axis in the block currently executed to the retreat position from the rising edge position.

The interference determination unit 140 may acquire the position of the obstacle, for example, from the parameters indicating the coordinate position and the like of the obstacle stored in the parameter storage unit 210. Moreover, the interference determination unit 140 may acquire the position of the obstacle from a sensor or the like attached to a punch press machine (not shown). In this case, the sensor attached to the punch press machine may be any sensor which can detect the position of a predetermined target, such as an ultrasonic sensor or a photoelectric sensor, and the position of the obstacle may be set so as to be able to be acquired from the absolute position in the coordinate system on the machine tool or from the relative position viewed from the punch head.

Figure 3:
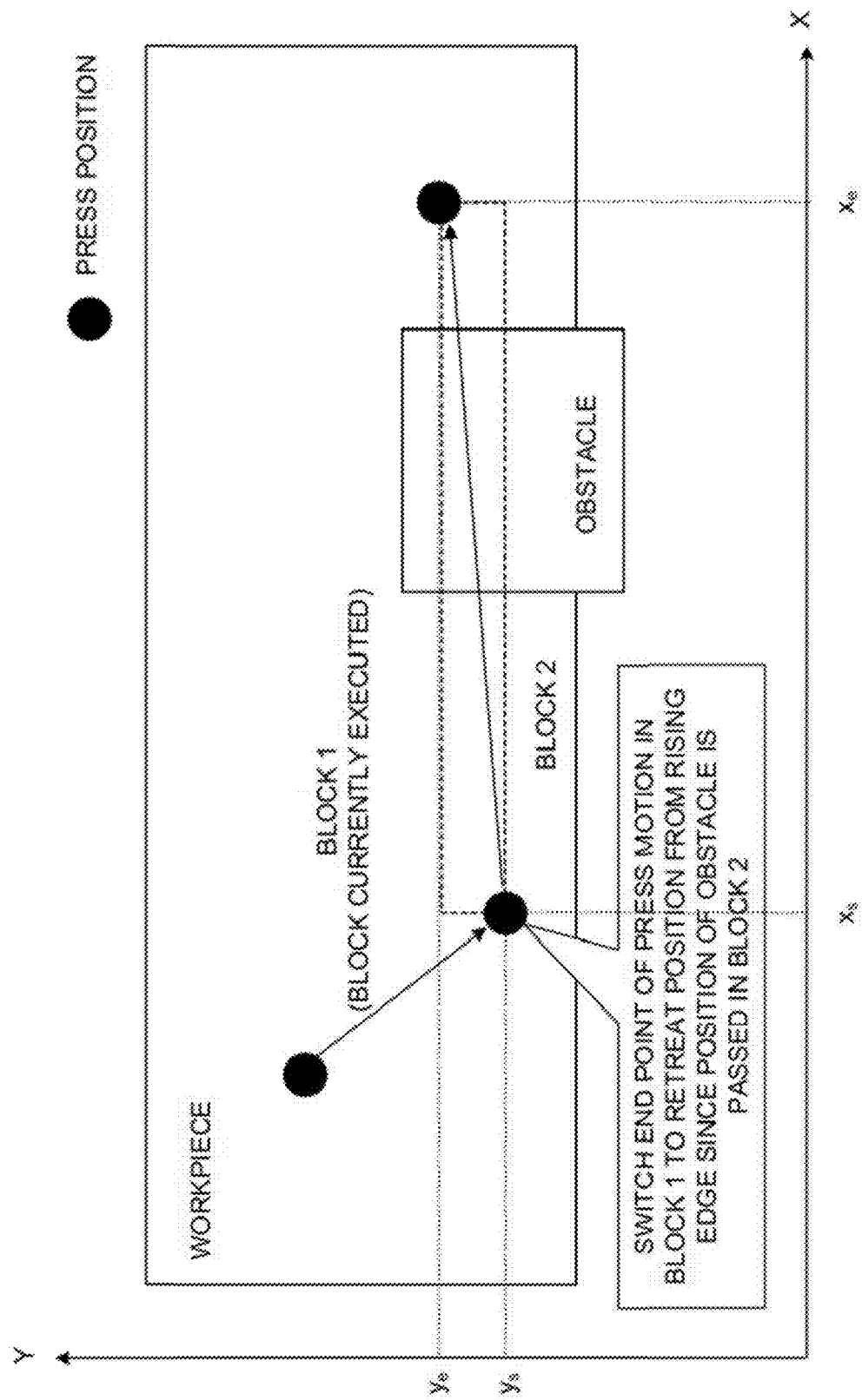
FIG. 3 is a diagram showing an example of determination on necessity of switching control for the end point position of the rising motion of a punch tool according to one embodiment.

For example, as shown in FIG. 3, the interference determination unit 140 may command the rising end point position switching unit 150 to switch the end point of the rising motion of the press axis of a predetermined block (referred to as block 1) to the retreat position when there is an obstacle in the movement range of the punch tool by the block 2 (e.g., a linear range from the coordinate positions ($x_s$, $y_s$) of the X/Y axes at the starting point of a block (block 2) next to the block 1 to the coordinate positions ($x_e$, $y_e$) of the X/Y axes at the end point, or, more safely, a rectangular range in which each side is parallel to the X/Y axes where the coordinate positions ($x_s$, $y_s$) of the X/Y axes at the starting point of the block 2 and the coordinate positions ($x_e$, $y_e$) of the X/Y axes at the end point are serving as opposite vertices), based on the result obtained by prefetching and analyzing the block 2 by the command analysis unit 100, while each servomotor is controlled based on the command data created based on the result obtained by analyzing the block 1 by the command analysis unit 100.

Based on the information obtained by prefetching and analyzing by the command analysis unit 100 and the information on the coordinate position of the obstacle, the interference determination unit 140 further determines whether or not the punch tool reaches the position of the obstacle while the press axis moves to the retreat position. Then, when the interference determination unit 140 determines that the punch tool reaches the position of the obstacle while the press axis moves to the retreat position, the interference determination unit 140 regards that there is a possibility that the punch tool interferes with the obstacle, and commands the interlock control unit 160 to interlock the X/Y axes until the press motion is completed. The interference determination unit 140 may handle, as a retreat time, a time obtained by adding a predetermined safety time for safety to a time taken by the press axis to move to the retreat position. For example, this safety time may be set in the parameter storage unit 210 as a parameter or can be set in the NC program 200.

By using FIG. 4, methods for calculating a retreat time t by the interference determination unit 140 (a time from when the press axis reaches the retreat position until when a safety time $t_s$ elapses) and a movement amount b by which the X/Y axes move during the retreat time t will be described.

Figure 4:
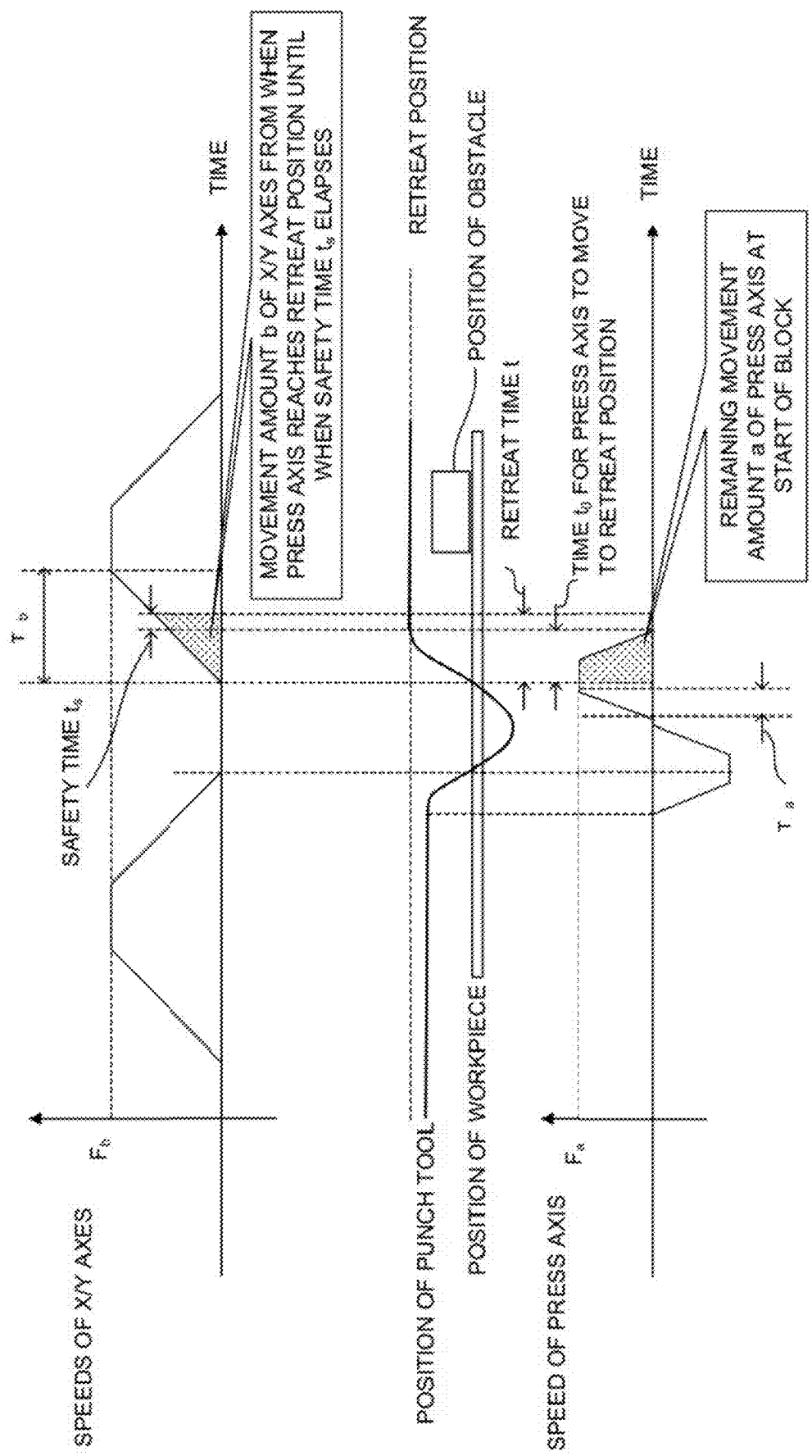
FIG. 4 is a diagram showing an example of determination of necessity of interlock control for the X/Y axes during the rising motion of the punch tool according to one embodiment.

In FIG. 4, the retreat time is t, a time for the press axis to move to the retreat position is $t_0$, the safety time is $t_s$, a time constant of acceleration/deceleration of the press axis is $\tau_a$, a time constant of acceleration/deceleration of the X/Y axes is $\tau_b$, a command speed of the press axis is $F_a$, a command speed of the X/Y axes is $F_b$, the remaining movement amount of the press axis at the start of the block is a, and the movement amount of the X/Y axes from when the press axis reaches the retreat position and until when the safety time $t_s$ elapses is b. At this time, when the condition shown in the following expression (1) is met, the remaining movement amount a of the press axis can be calculated by the following expression (2). Thus, the retreat time t can be calculated by the following expression (3).

$$\frac{a}{F_a} > \tau_a \tag{1}$$

$$a = \frac{F_a \tau_a}{2} + (t_0 - \tau_a) F_a \tag{2}$$

$$t = t_0 + t_s = \frac{a}{F_a} + \tau_a - \frac{\tau_a}{2} + t_s \tag{3}$$

On the other hand, when the condition shown in the following expression (4) is met, the remaining movement amount a of the press axis can be calculated by the following expression (5). Thus, the retreat time t can be calculated by the following expression (6).

$$\frac{a}{F_a} \leq \tau_a \quad (4)$$

$$a = F_a \frac{t_0^2}{\tau_a} \quad (5)$$

$$t = t_0 + t_s = \sqrt{\frac{a\tau_a}{F_a}} + t_s \quad (6)$$

Then, by using the retreat time t calculated by the expression (3) or (6), the movement amount b of the X/Y axes during the retreat time t can be calculated by the following expressions (7) to (10) (calculate for X and Y axes, respectively). That is, when the condition shown in the following expression (7) is met, the movement amount b is calculated by the following expression (8). It addition, when the condition shown in the following expression (9) is met, the movement amount b is calculated by the following expression (10).

$$t > \tau_b \quad (7)$$

$$b = \frac{F_b \tau_b}{2} + (t - \tau_b)F_b \quad (8)$$

$$t \leq \tau_b \quad (9)$$

$$b = F_b \frac{t^2}{\tau_b} \quad (10)$$

Then, when there is an obstacle in the range that the X/Y axes move by only the movement amount b calculated by the above calculation methods, the interference determination unit 140 should only command the interlock control unit 160 to interlock the X/Y axes until the press motion is completed.

For example, suppose that the coordinate position where the X/Y axes are moved from the coordinate positions ($x_s$, $y_s$) of the X/Y axes at the start of the block by the movement amount b of the X/Y axes during the retreat time t obtained above is ($x_b$, $y_b$). Then, when there is an obstacle in a movement range from the coordinate positions ($x_s$, $y_s$) to the coordinate positions ($x_b$, $y_b$) (e.g., the linear range from the coordinate positions ($x_s$, $y_s$) to the coordinate positions ($x_b$, $y_b$), or, more safely, the rectangular range in which each side is parallel to the X/Y axes where the coordinate positions ($x_s$, $y_s$) and the coordinate positions ($x_b$, $y_b$) are serving as opposite vertices), the interlock control unit 160 should be only commanded so as to stop (interlock) the movements of the X/Y axes until the movement of the press axis to the retreat position is completed.

Note that the interference determination unit 140 can also perform the above retreat operation based on the distance between the punch tool and the obstacle acquired from a sensor or the like attached to the punch press machine.

Based on the command from the interference determination unit 140, the rising end point position switching unit 150 commands the interpolation unit 110 to change the end point of the rising motion of the press axis by the block currently executed to the retreat position from the rising edge position.

Based on the command from the interference determination unit 140, the interlock control unit 160 commands the interpolation unit 110 to stop the movements of the X/Y axes in the block next to the block currently executed until the movement of the press axis by the block currently executed to the retreat position is completed.

Figure 5:
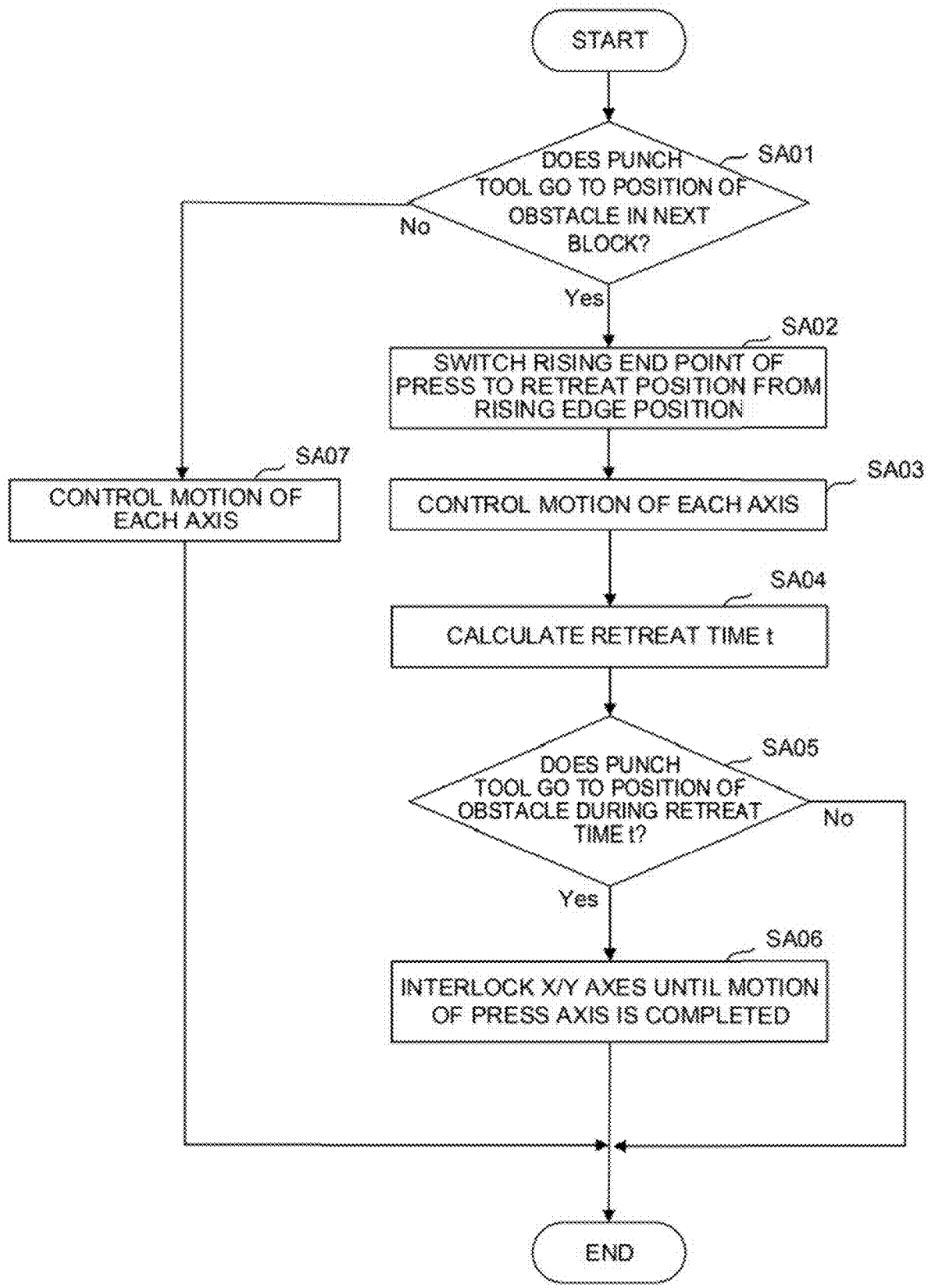
FIG. 5 is a flowchart showing the outline of a processing flow of the interference avoidance function executed on the numerical controller in FIG. 2.
Figure 6:
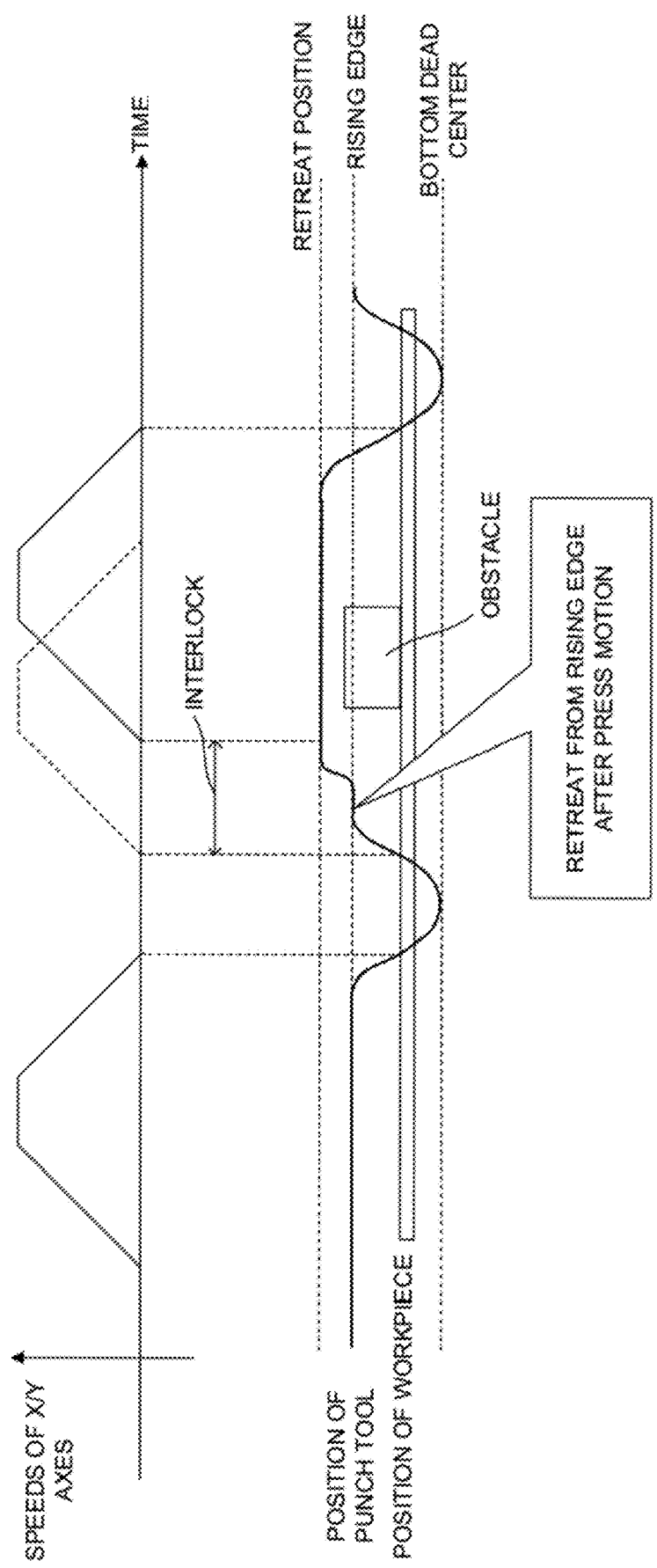
FIG. 6 is a diagram for explaining the outline of an interference avoidance technique according to a conventional technique.
Figure 7:
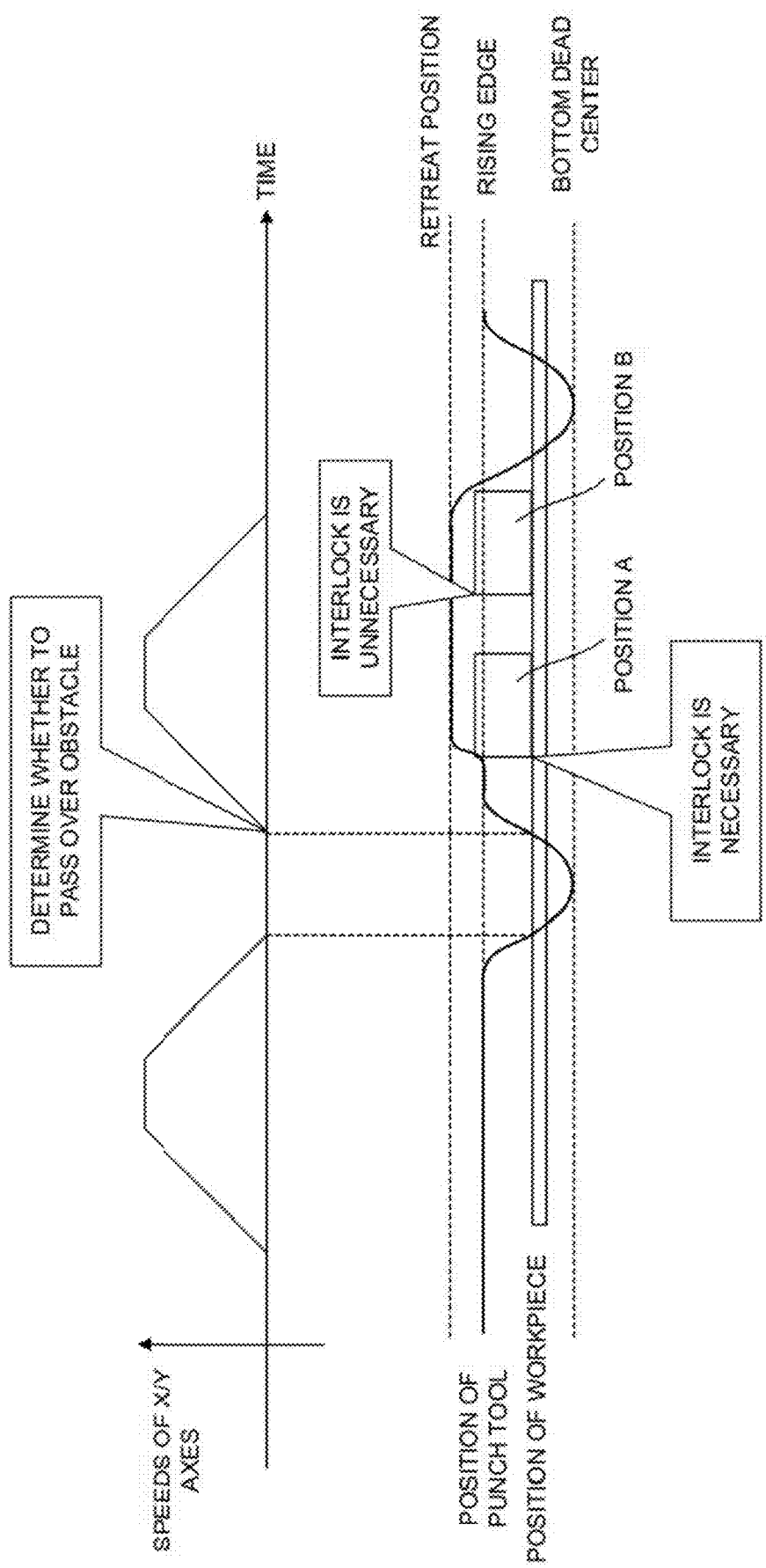
FIG. 7 is a diagram for explaining the problem of the interference avoidance technique according to the conventional technique.

FIG. 5 is a flowchart showing the outline of a processing flow of the interference avoidance function executed on the numerical controller 1. The series of processing shown in this flowchart are executed every control period of the numerical controller 1.

[Step SA01] The interference determination unit 140 determines whether or not the punch tool reaches or passes the position of the obstacle in the block next to the block currently executed. When the punch tool reaches or passes the position of the obstacle, the processing proceeds to Step SA02. If not, the processing proceeds to Step SA07.

[Step SA02] The interference determination unit 140 commands the rising end point position switching unit 150 to switch the rising position of the block currently executed to the retreat position from the rising edge position. In response to the command, the rising end point position switching unit 150 commands the interpolation unit 110 to switch the end point of the rising motion of the press axis in the block currently executed to the retreat position. Then, the interpolation unit 110 executes the interpolation processing again after changing the end point of the rising motion of the press axis of the block currently executed to the retreat position and creates the interpolation data again.

[Step SA03] The numerical controller 1 controls the motion of each axis including the press axis.

[Step SA04] The interference determination unit 140 calculates the retreat time t by the calculation methods previously mentioned.

[Step SA05] The interference determination unit 140 determines whether or not the punch tool reaches or passes the position of the obstacle during the retreat time t by the determination methods previously mentioned. When the punch tool reaches or passes the position of the obstacle during the retreat time t, the processing proceeds to Step SA06. If not, the present processing in the current control period ends.

[Step SA06] The interference determination unit 140 commands the interlock control unit 160 to stop the movements of the X/Y axes by the block next to the block currently executed until the motion of the press axis by the block currently executed is completed. In response to the command, the interlock control unit 160 commands the interpolation unit 110 to stop the movements of the X/Y axes by the block next to the block currently executed until the motion of the press axis by the block currently executed is completed. Then, the interpolation unit 110 stops outputting (outputting the interpolation data) the movement amounts of the X/Y axes by the block next to the block currently executed until the motion of the press axis of the block currently executed is completed.

[Step SA07] The numerical controller 1 controls the motion of each axis including the press axis.

Although the embodiments of the present invention have been described above, the present invention is not limited only to the examples of the embodiments described above and can be carried out in various modes by making appropriate changes.

In the embodiments described above, the examples, in which the avoidance of the interference between the punch tool and the obstacle is controlled based on the position of the obstacle on the X/Y axes, have been shown. However, for example, the necessity of the interlock control for the X/Y axes may be more precisely performed by calculating, as the retreat position, a position obtained by adding a safety distance to the height of the obstacle and controlling the position of the end point of the rising motion of the press axis to be switched to the retreat position thus calculated after the position of the obstacle is made to be able to be detected to the position in the direction of the press axis in addition to the positions on the X/Y axes and the determination of the interference between the punch tool and the obstacle in the direction of the press axis (height direction) is performed by the interference determination unit 140.

Moreover, the example of the numerical controller including both the rising end point position switching unit 150 and the interlock control unit 160 is shown in the embodiments described above, but the effects of the present invention can be sufficiently achieved by a numerical controller including either of them.

The invention claimed is:

1. A numerical controller that controls, based on a program, a machine tool for performing punch press machining on a workpiece by a tool attached to a punch head, the numerical controller comprising:
   a command analysis unit that analyzes a command block read out from the program, generates command data and outputs the generated command data;
   an interpolation unit that performs interpolation processing based on the command data, generates interpolation data and outputs the generated interpolation data;
   an interference determination unit that determines a possibility of interference between the tool and an obstacle on the workpiece; and
   an interlock control unit that stops, based on a determination result by the interference determination unit, movements of X/Y axes of the tool attached to the punch head in a command block next to the command block currently executed until a rising motion, based upon the command data, of a press axis of the machine is completed;
   wherein the interference determination unit determines whether or not the tool reaches a position of the obstacle on the X/Y axes of the machine tool during the completion of the rising motion of the press axis of the machine tool,
   and, when the interference determination unit determines that the tool reaches the position of the obstacle on the X/Y axes of the machine tool during the completion of the rising motion of the press axis of the machine tool, the interference determination unit commands the interlock control unit to stop movements of the X/Y axes by the command block next to the command block until the rising motion of the press axis of the machine tool based upon the command data is completed,
      wherein in the command data for the command block next to the command block currently executed, an end point of the rising motion at the command block currently executed is switched to a new position of a rising edge of the obstacle until a press motion of the punch press machining is complete.

2. The numerical controller according to claim 1, further comprising a parameter storage unit that stores a position of the obstacle as a parameter,
   wherein the interference determination unit determines whether the tool interferes with the obstacle on the workpiece based on the position of the obstacle stored in the parameter storage unit.

3. The numerical controller according to claim 1, wherein the machine tool comprises a sensor that detects a position of the obstacle on the workpiece, and
   the interference determination unit determines whether the tool interferes with the obstacle on the workpiece based on the position of the obstacle detected by the sensor.

4. The numerical controller according to claim 1, further comprising a rising end point position switching unit that switches an end point position of rising motion of the tool in the command data to a retreat position from a rising edge based on a determination result by the interference determination unit.

* * * * *